United States Patent
Cudak et al.

(10) Patent No.: US 11,113,378 B2
(45) Date of Patent: Sep. 7, 2021

(54) CONTENT-BASED AUTHENTICATION

(71) Applicant: Lenovo (Singapore) Pte. Ltd., Singapore (SG)

(72) Inventors: Gary D. Cudak, Wake Forest, NC (US); Nathan J. Peterson, Durham, NC (US); Amy L. Rose, Chapel Hill, NC (US); Jennifer J. Lee-Baron, Morrisville, NC (US); Bryan L. Young, Tualatin, OR (US); John S. Crowe, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1089 days.

(21) Appl. No.: 14/971,524

(22) Filed: Dec. 16, 2015

(65) Prior Publication Data

US 2017/0177850 A1     Jun. 22, 2017

(51) Int. Cl.
*G06F 21/00* (2013.01)
*G06F 21/36* (2013.01)
*G06F 21/31* (2013.01)

(52) U.S. Cl.
CPC .............. *G06F 21/36* (2013.01); *G06F 21/31* (2013.01); *G06F 2221/2101* (2013.01); *G06F 2221/2103* (2013.01)

(58) Field of Classification Search
CPC .. G06F 21/36; G06F 21/31; G06F 2221/2101; G06F 2221/2103; G06F 21/316
See application file for complete search history.

(56) References Cited

U.S. PATENT DOCUMENTS

| | | | |
|---|---|---|---|
| 6,263,439 B1* | 7/2001 | Hondros | G06F 21/40 713/182 |
| 8,250,632 B1 | 8/2012 | Staddon | |
| 8,856,541 B1* | 10/2014 | Chaudhury | G06F 21/32 382/115 |
| 2002/0029341 A1* | 3/2002 | Juels | H04L 9/3236 713/184 |
| 2004/0093527 A1* | 5/2004 | Pering | G06F 21/36 726/5 |

(Continued)

FOREIGN PATENT DOCUMENTS

| | | |
|---|---|---|
| CN | 101416196 | 4/2009 |
| WO | 2015107396 | 7/2015 |

OTHER PUBLICATIONS

Combined Search and Examination Report for Application No. GB1619947.3, UK Intellectual Property Office, dated May 9, 2017, 9 pages.

(Continued)

*Primary Examiner* — John B King
(74) *Attorney, Agent, or Firm* — Vanleeuwen & Vanleeuwen; Jason A. Friday

(57) ABSTRACT

An approach is disclosed that presents, to a user of a device, content items accessible from the device with the content items being identified as familiar to an actual user of the device. In addition, one or more comparable items are also presented with the comparable items being identified as unfamiliar to the actual user of the device. A response is received from the user at the device that differentiates the content items the comparable items with the user being authenticated, or not, based on the response.

11 Claims, 5 Drawing Sheets

(56) References Cited

U.S. PATENT DOCUMENTS

| | | | |
|---|---|---|---|
| 2004/0230843 A1* | 11/2004 | Jansen | G06F 21/36 726/7 |
| 2010/0043062 A1* | 2/2010 | Alexander | G06F 21/36 726/6 |
| 2010/0122340 A1 | 5/2010 | Chow et al. | |
| 2010/0199338 A1 | 8/2010 | Craddock et al. | |
| 2011/0191838 A1 | 8/2011 | Yanagihara | |
| 2011/0246951 A1 | 10/2011 | Chen | |
| 2012/0005735 A1* | 1/2012 | Prasanna | G06F 21/36 726/7 |
| 2012/0066744 A1 | 3/2012 | Knox | |
| 2013/0036461 A1* | 2/2013 | Lowry | G06F 21/36 726/19 |
| 2014/0130148 A1 | 5/2014 | Sako et al. | |
| 2014/0189829 A1 | 7/2014 | McLachlan et al. | |
| 2015/0178490 A1* | 6/2015 | Tamboly | G06F 21/46 726/4 |
| 2015/0302187 A1* | 10/2015 | Verma | G06F 21/60 726/9 |
| 2015/0304299 A1 | 10/2015 | Murarka | |
| 2016/0042172 A1* | 2/2016 | Chiplunkar | G06F 1/3231 726/19 |

OTHER PUBLICATIONS

European Search Report for Application No. EP 16 20 4863, European Patent Office, dated May 12, 2017, 5 pages.

\* cited by examiner

CONTENT-BASED AUTHENTICATION

BACKGROUND

User login security in computer systems is very important. Many methods exist to allow users to login to their systems and access their files. These methods include use of user identifiers and passwords, PIN, pattern entry, and the like. For instance, some are developing use of an electroencephalogram (EEG) that allows users to "think" a password to log in. Given the importance of user login security, new methods of logging into a computer system are highly desirable.

A challenge facing traditional login approaches is that it is not uncommon for a user to be locked out of their device. Such a lock out can occur due to the user forgetting a user identifier or password, encountering a screen with a "dead spot" on a portion of the login sequence, etc. Gaining In these circumstances, system access can be very difficult and may result in a loss of data for the user.

SUMMARY

An approach is disclosed that presents, to a user of a device, content items accessible from the device with the content items being identified as familiar to an actual user of the device. In addition, one or more comparable items are also presented with the comparable items being identified as unfamiliar to the actual user of the device. A response is received from the user at the device that differentiates the content items the comparable items with the user being authenticated, or not, based on the response.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein.

DETAILED DESCRIPTION

Figure 1:
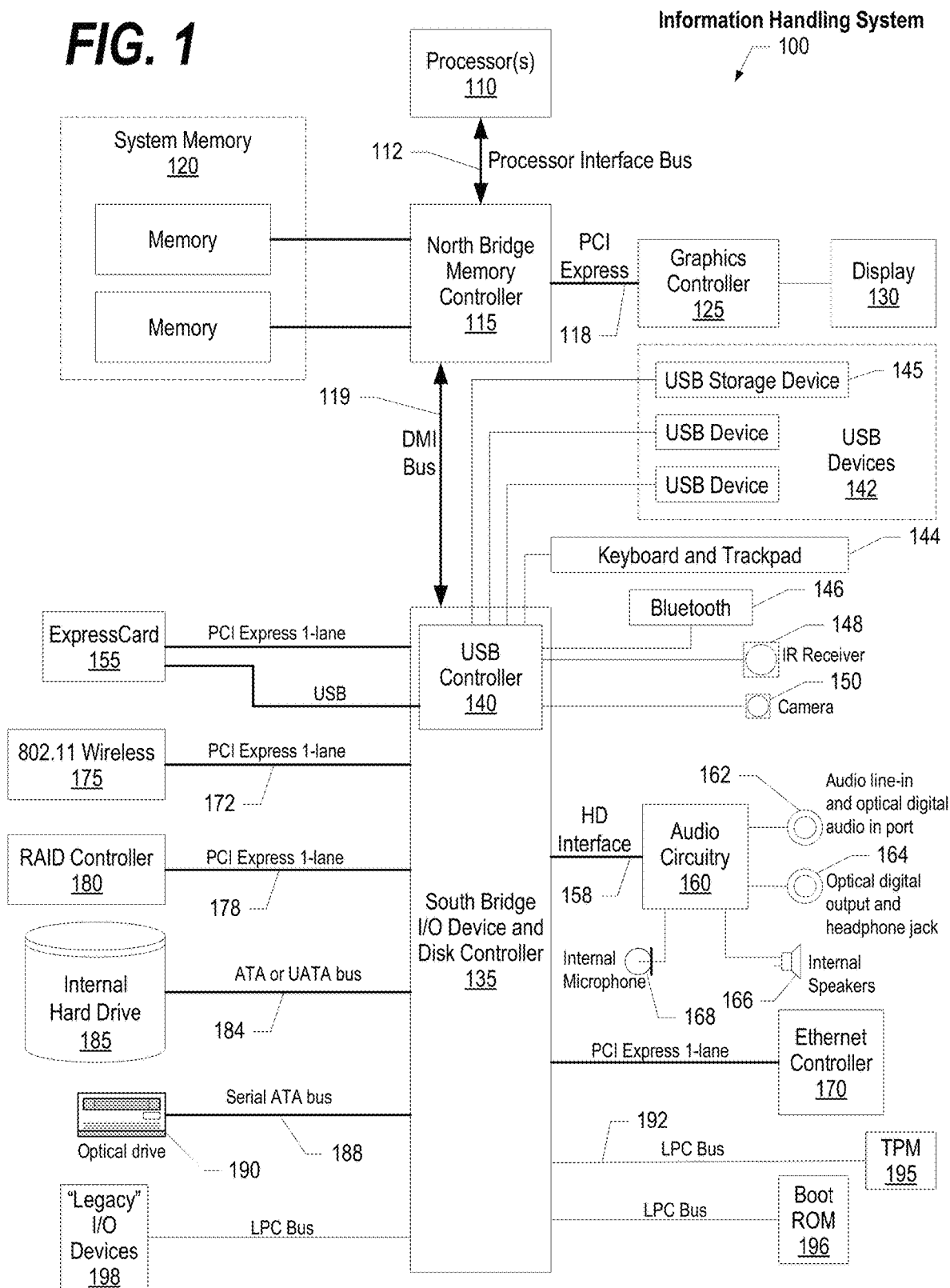
FIG. 1 is a block diagram of a data processing system in which the methods described herein can be implemented.

FIGS. 1-5 show an approach that authenticates a user responsive to identification of local data on the user's device. The approach can be used on most any device, such as tablets, laptops, phones, servers, etc. In the approach, local content is mixed with unfamiliar content. The user is presented with both the local and the unfamiliar content. The user is authenticated based on correct identification of the local content.

In one embodiment, a need to engage the content based login is determined, such as based on a user setting, as a primary login method, based on a user setting as a backup login method, and based on a primary login method being unsuccessful. A list of items is obtained to present to a user, with these items being items that should be known to the user because they reside in local files of the device. Items may include images, music, documents or portions of documents, movies or other media, a full or partial list of installed applications on the device, a listing of frequently accessed applications, or a listing of partial contact information. User configurable options may be used to limit what files or regions can be accessed for the data items.

The approach also obtains a comparable list of items to present to a user, with the comparable items not being local to the device. Such comparable content may be downloaded either prior to invoking the function, or accessed as the function is needed. The items and comparable items are presented to a user. Media files, such as music or videos, may be played with either a portion of media files being played or media files played in their entirety. With images, the approach displays several non-local images and a local image with the user being prompted to identify the local image. Multiple cycles of presentation of different types of content may be utilized, such as presenting a set of images, followed by presenting music, followed by presenting document portions/snippets).

The approach validates the responses provided by the user. The user responses include identifying the local content and may also include identifying the non-local content. The user is authenticated based on the correct responses, or responses, received from the user. In one embodiment, user settings may determine any number of necessary selections needed to authenticate the user. For example, a strong setting may require passing eight presentations, each with a different type of media—such as one step of images, one of songs, one of document snippets, etc. User settings may also determine the number of false samples to present relative to the correct sample, such as presenting five false images for every one correct image, etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium does not include a computer readable signal medium.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 2:
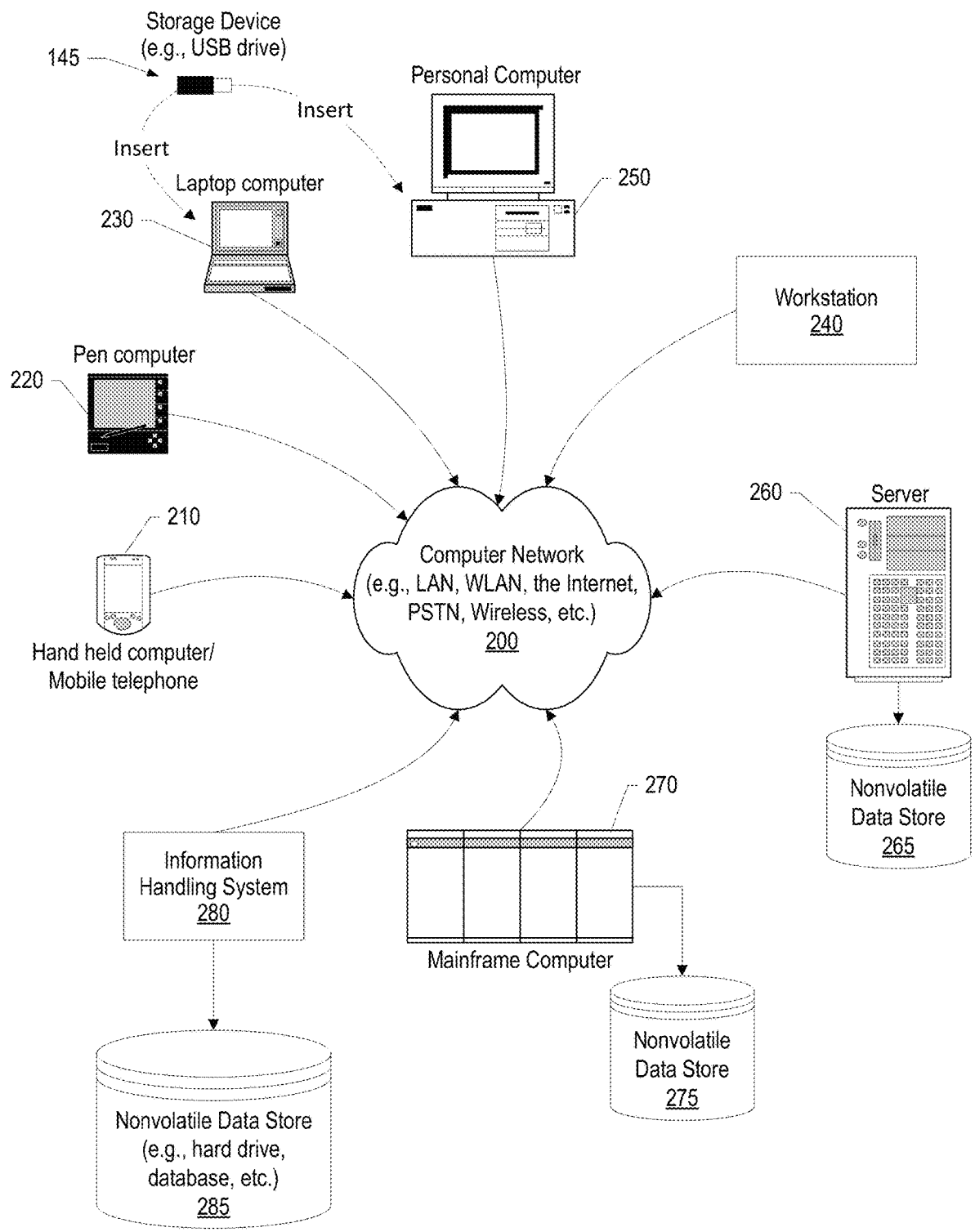
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
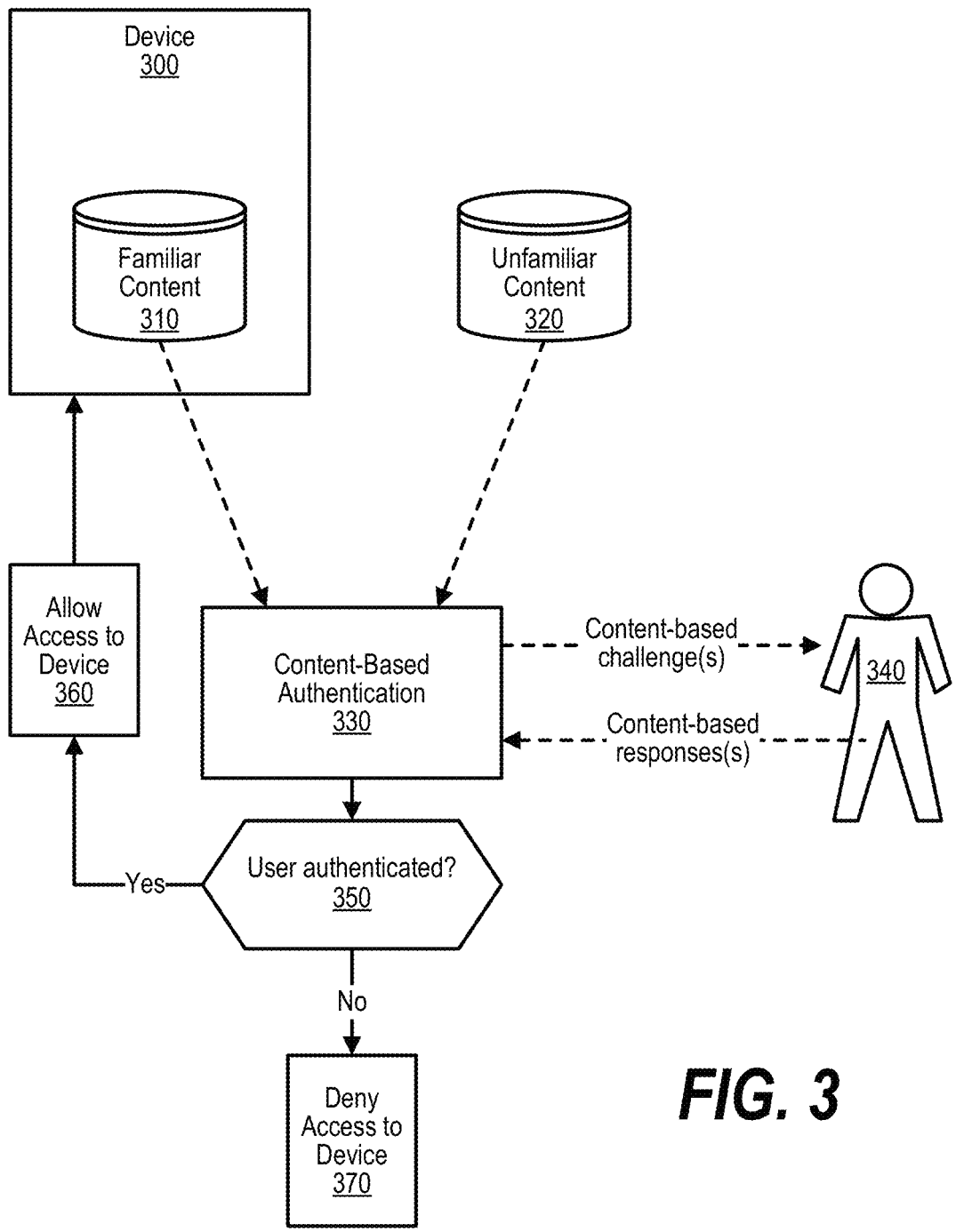
FIG. 3 is a high level component diagram depicting the components involved in providing content-based authentication.

FIG. 3 is a high level component diagram depicting the components involved in providing content-based authentication. Device 300, such as a a tablet system, a laptop system, a smart phone, a server computer system, or the like is currently locked and, therefore, inaccessible to user 340. Device 300 includes nonvolatile memory 310 on which is stored content that is familiar to the actual user of the device. In order to ascertain whether user 340 is the actual, legitimate user of the device or an illegitimate user attempting to use device 300 without permission, a content-based authentication is performed by process 330.

Content-based authentication 330 is executed by device 300 and presents content items from familiar content data store 310 as well as comparable items from unfamiliar content 320, with the unfamiliar content being comparable to the familiar content but not familiar to the actual user of device 300. In one embodiment, different categories of content are used with the content items selected from the familiar content being of the same category as comparable items selected from the unfamiliar content. Examples of categories might include images, music, documents or portions of documents, movies or other media, a full or partial list of installed applications on the device, a listing of frequently accessed applications, or a listing of partial contact information, etc.

The content items and comparable items are presented to user 340 as a challenge with the user asked to differentiate the content items familiar to the actual user that have been retrieved from the nonvolatile memory of the device with the comparable items that are identified as being unfamiliar to the actual user of the device. For example, the user might be presented with five content items and one comparable item and asked to select the item or items that are not stored on the device. Likewise, the user might be presented with one or two content items and several comparable items and asked to select the item or items that are stored on the device.

Based on the user's response, or responses, the content-based authentication process determines whether the user is authenticated (decision 350). If the user is authenticated, then decision 350 branches to the 'yes' branch whereupon, at step 360, the user is granted access to the device and can then access data stored on the device. Conversely, if the user is not authenticated, then decision 350 branches to the 'no' branch whereupon, at step 370, the user is denied access to the device and is inhibited from accessing data stored on the device.

Figure 4:
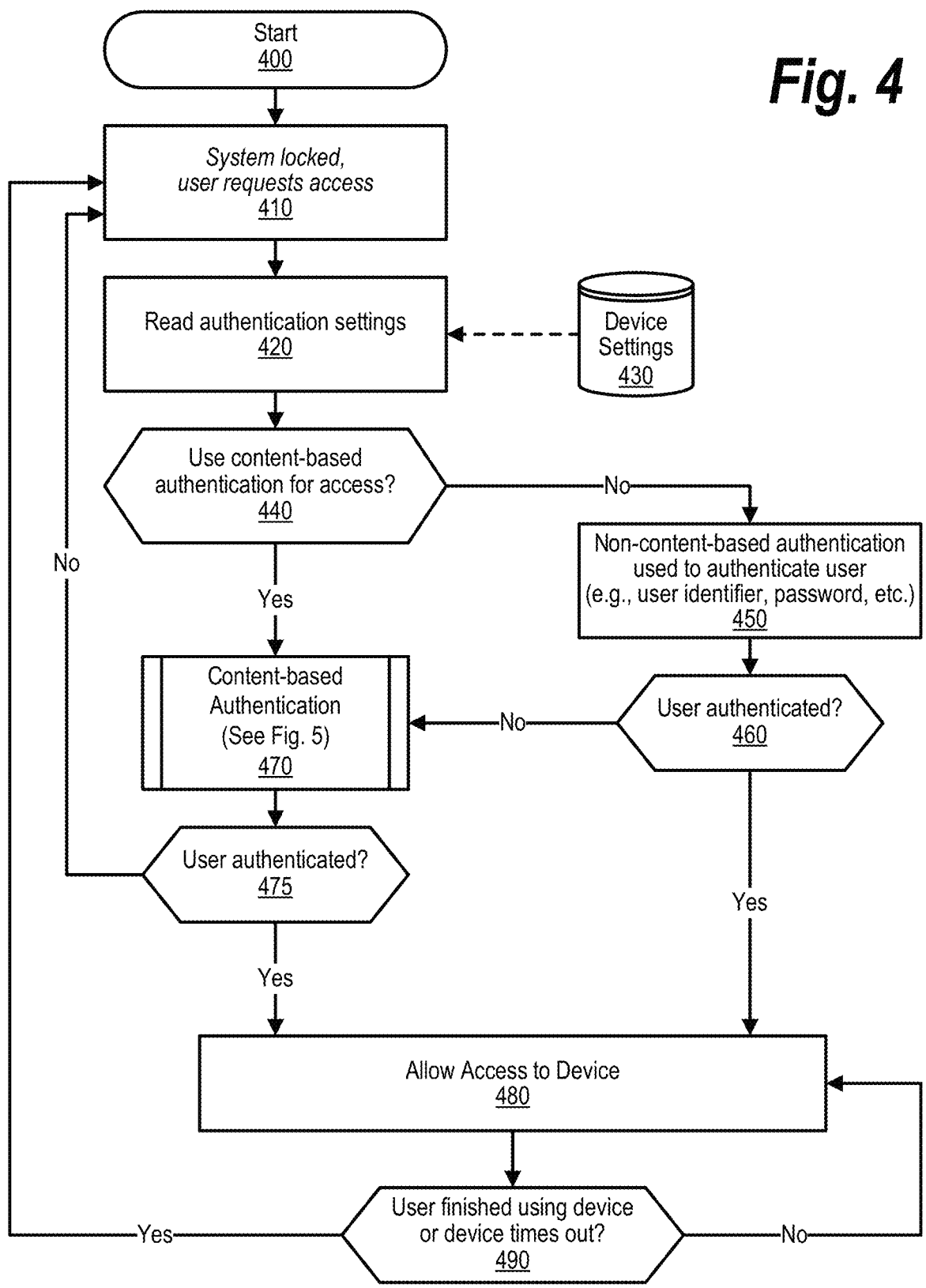
FIG. 4 is a flowchart depicting the overall steps used in one embodiment of a content-based authentication system.

FIG. 4 is a flowchart depicting the overall steps used in one embodiment of a content-based authentication system. FIG. 4 processing commences at 400 and shows the steps taken by a process that runs on a device to provide content-based authentication of users of the device. At step 410, the device is shown as being locked, with the user requesting access to the device, such as at a login screen.

At step 420, the process reads authentication settings from data store 430. Based on the authentication settings, the process determines as to whether the authentication settings are set to use the content-based authentication for initial access to the system rather than using more traditional authentication approaches (decision 440). If a traditional initial login approach is being used, then decision 440 branches to the 'no' branch whereupon, at step 450, the user is prompted to provide the traditional authentication data, such as a user identifier and password. In this approach, the content-based authentication is used if the traditional authentication approach fails. Using the traditional approach, the process determines whether the user was successfully authenticated using the traditional authentication data (decision 460). If the user was successfully authenticated, then decision 460 branches to the 'yes' branch whereupon access to the device is allowed at step 480 and can access data stored on the device. On the other hand, if the user was authenticated in step 450, then decision 460 branches to the 'no' branch.

Figure 5:
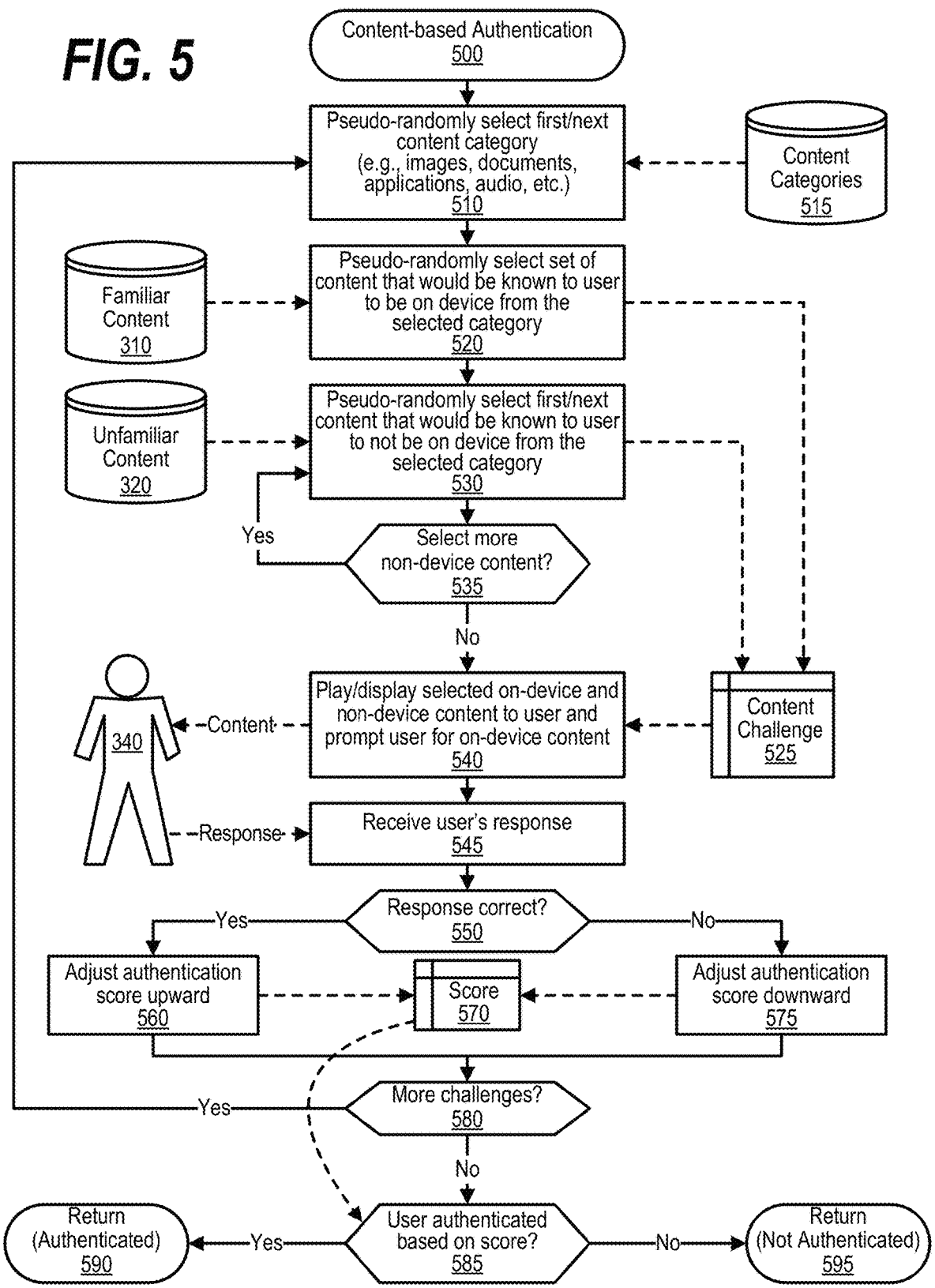
FIG. 5 is a flowchart showing more detailed steps involved in providing the content-based authentication of a user to a system.

At predefined process 470, the process performs the Content-based Authentication routine (see FIG. 5 and corresponding text for processing details). This predefined process is performed if either content-based authentication is being used as the primary authentication to the device (with decision 440 branching to the 'yes' branch), or if content-based authentication is being used after a traditional login process fails (with decision 460 branching to the 'no' branch) The process determines as to whether the user authenticated based on the performance of the content-based authentication routine (decision 475). If the user was successfully authenticated based on the performance of the content-based authentication routine, then decision 475 branches to the 'yes' branch and, at step 480, the user is allowed access to the device and can access data stored on the device. On the other hand, if the user was not authenticated by the performance of predefined process 470, then decision 475 branches to the 'no' branch which loops back to continue keeping the device locked and the data inaccessible to the user.

During usage of the device, from time to time the process determines whether the user is finished using device or if the device times out from lack of use (decision 490). If the user is finished using device or if the device times out from lack of use, then decision 490 branches to the 'yes' branch which loops back to step 410 to lock the device and making data stored on the device inaccessible until the user is successfully authenticated, as described above. On the other hand, if the user is not finished using device and the device does not time out from lack of use, then decision 490 branches to the 'no' branch which loops back to step 480 allowing the user continued use of the device and continued access to data stored on the device.

FIG. 5 is a flowchart showing more detailed steps involved in providing the content-based authentication of a user to a system. FIG. 5 processing commences at 500 and shows the steps taken by a process that performs the content-based authentication routine. At step 510, the process selects the first content category from a list of categories stored in data store 515. Examples of content categories includes images, documents, applications, audio, media, contacts, installed applications, etc.

At step 520, the process selects a set of content items that would be familiar to the actual, or legitimate, user of the device as being content items stored on the device. The content items are selected from items included in the category selected in step 510. The selected content items are stored in content challenge memory area 525. At step 530, the process selects the first comparable content that would be unfamiliar to the actual, or legitimate, user as such actual user would likely know that such comparable items are not stored on the device. The comparable content is selected from the same content category (e.g., images, documents, etc.) from which the content items were selected in step 520. In one embodiment, at least some of the comparable content is retrieved from a computer network, such as web sites accessible from the Internet. The selected comparable items are stored in content challenge memory area 525.

The process determines as to whether to select more unfamiliar comparable content items (decision 535). If more unfamiliar comparable content items are selected, then decision 535 branches to the 'yes' branch which loops back to step 530 to select the next comparable item within the selected content category. This looping continues until no more unfamiliar comparable content items are being selected, at which point decision 535 branches to the 'no' branch exiting the loop.

At step 540, the process presents the selected content items and comparable items to the user and prompts user to differentiate between content items familiar to the actual user as being stored on the device and unfamiliar items known by the actual user as not being stored on the device. At step 545, the process receives the response from the user. The process determines as to whether the user's response was correct with a correct response correctly differentiating between the content items and the comparable items (decision 550). If the user's response was correct, then decision 550 branches to the 'yes' branch whereupon, at step 560, the process adjusts an authentication score upward reflecting the correct response. On the other hand, if the user's response was incorrect, then decision 550 branches to the 'no' branch whereupon, at step 575, the process adjusts the authentication score downward reflecting the incorrect response. The authentication score is stored in memory area 570.

The process determines as to whether to present the user with additional content-based challenges (decision 580). If the user is to be presented with additional content-based challenges, then decision 580 branches to the 'yes' branch which loops back to step 510 to repeat the processing described above. This looping continues until no more content-based challenges are being presented, at which point decision 580 branches to the 'no' branch exiting the loop.

Based on the authentication score stored in memory area 570, the process determines as to whether the user was successfully authenticated based on the content-based challenges (decision 585). If the user was successfully authenticated, then decision 585 branches to the 'yes' branch whereupon, at 590, processing returns to the calling routine (see FIG. 4) with a return code indicating that the user was successfully authenticated by the routine. On the other hand, if the user was not successfully authenticated, then decision 585 branches to the 'no' branch whereupon, at 595, processing returns to the calling routine (see FIG. 4) with a return code indicating that the user was not successfully authenticated by the routine.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method comprising:
   selecting a plurality of content categories from a set of content categories, wherein one of the selected content categories is an image category and at least one of the selected content categories is a non-image category;
   presenting, to a user of a device, a plurality of content items that are identified as being familiar to an actual user of the device and a plurality of comparable items that are identified as being unfamiliar to the actual user of the device, wherein each of the content items and each of the comparable items corresponds to the selected plurality of content categories;
   receiving a plurality of responses at the device from the user after the presenting; and
   determining a number of correct responses from the plurality of responses, wherein an authentication of the user is based on the number of correct responses.

2. The method of claim 1 wherein the authentication is performed before allowing the user access to data stored on the device.

3. The method of claim 1 further comprising:
   retrieving the content items from a nonvolatile memory accessible from the device; and
   retrieving the comparable items from a computer network accessible from the device.

4. The method of claim 1 further comprising: performing the presenting, receiving, and determining in response to the user being locked out of the device due to one or more failed login attempts using a primary authentication challenge.

5. An information handling system comprising:
   one or more processors;
   a memory coupled to at least one of the processors;
   a set of instructions stored in the memory and executed by at least one of the processors to perform actions comprising:
      select a plurality of content categories from a set of content categories, wherein one of the selected content categories is an image category and at least one of the selected content categories is a non-image category;
      present, to a user of a device, a plurality of content items that are identified as being familiar to an actual user of the device and a plurality of comparable items that are identified as being unfamiliar to the actual user of the device, wherein each of the content items and each of the comparable items corresponds to the selected plurality of content categories;
      receive a plurality of responses at the device from the user after the presenting; and
      determine a number of correct responses from the plurality of responses, wherein an authentication of the user is based on the number of correct responses.

6. The information handling system of claim 5 wherein the actions further comprise:
   allow the user access to data stored on the device in response to a successful authentication of the user.

7. The information handling system of claim 5 wherein the actions further comprise:
   retrieve the content items from a nonvolatile memory accessible from the device; and
   retrieve the comparable items from a computer network accessible from the device.

8. The information handling system of claim 5 wherein the actions further comprise: perform the actions to present, receive, and determine in response to the user being locked out of the device due to one or more failed login attempts using a primary authentication challenge.

9. A computer program product comprising:
   select a plurality of content categories from a set of content categories, wherein one of the selected content categories is an image category and at least one of the selected content categories is a non-image category;
   present, to a user of a device, a plurality of content items that are identified as being familiar to an actual user of the device and a plurality of comparable items that are identified as being unfamiliar to the actual user of the device, wherein each of the content items and each of the comparable items corresponds to the selected plurality of content categories;
   receive a plurality of responses at the device from the user after the presenting; and determine a number of correct responses from the plurality of responses, wherein an authentication of the user is based on the number of correct responses.

10. The computer program product of claim 9 wherein the set of instructions comprise additional instructions effective to:

allow the user access to data stored on the device in response to a successful authentication of the user.

11. The computer program product of claim 9 wherein the set of instructions comprise additional instructions effective to:

retrieve the content items from a nonvolatile memory accessible from the device; and retrieve the comparable items from a computer network accessible from the device.

\* \* \* \* \*